United States Patent [19]

Sugawara et al.

[11] Patent Number: 5,471,316
[45] Date of Patent: Nov. 28, 1995

[54] ADAPTIVE SYSTEM FOR SELECTIVELY RECORDING FROM A PLURALITY OF VIDEO SOURCES AND METHOD THEREOF

[75] Inventors: Kazuaki Sugawara; Hideo Ito, both of Meguro, Japan

[73] Assignee: Pioneer Electronic Corporation, Tokyo, Japan

[21] Appl. No.: 77,841

[22] Filed: Jun. 15, 1993

[30] Foreign Application Priority Data

Jun. 18, 1992 [JP] Japan ............................ 4-159831
Sep. 28, 1992 [JP] Japan ............................ 4-258577

[51] Int. Cl.$^6$ ........................ H04N 5/76; H04N 5/78; G11B 5/09
[52] U.S. Cl. ..................... 358/342; 360/33.1; 360/48
[58] Field of Search .................... 358/335, 310, 358/342, 311; 360/33.1, 35.1, 14.1, 14.2, 14.3, 32, 15, 48, 18, 20, 21; H04N 5/92, 9/79, 5/76, 5/78, 5/781, 5/782, 5/783

[56] References Cited

U.S. PATENT DOCUMENTS

| | | | |
|---|---|---|---|
| 4,703,369 | 10/1987 | Moriyama et al. | 358/343 |
| 4,974,111 | 11/1990 | Platte et al. | 358/311 |
| 5,097,348 | 3/1992 | Suetaka | 358/335 |
| 5,128,775 | 7/1992 | Suzuki et al. | 358/342 |
| 5,140,437 | 8/1992 | Yonemitsu et al. | 358/342 |
| 5,179,449 | 1/1993 | Doi | 358/311 |
| 5,187,589 | 2/1993 | Kono et al. | 358/335 |
| 5,262,877 | 11/1993 | Otsuka | 358/342 |
| 5,307,171 | 4/1994 | Azuma et al. | 358/335 |
| 5,331,474 | 7/1994 | Lee | 358/311 |

FOREIGN PATENT DOCUMENTS

| | | | |
|---|---|---|---|
| 313190 | 1/1991 | Japan | H04N 7/18 |
| 3190387 | 8/1991 | Japan | H04N 5/91 |

Primary Examiner—Thai Q. Tran
Attorney, Agent, or Firm—Kane, Dalsimer, Sullivan, Kurucz, Levy, Eisele and Richard

[57] ABSTRACT

An adaptive video recording system for selectively recording a plurality of video signals outputted from a plurality of video sources one after another, is provided with: a recording medium, to which at least the video signals and recording information data related to the video signals, are recorded by a field or frame unit in a randomly accessible manner; a recorder for recording the video signals and the recording information data related to the video signals, to the recording medium; and a switcher, coupled to the video sources and the recorder, for switching and outputting the video signals from the video sources to the recorder.

15 Claims, 12 Drawing Sheets

ADAPTIVE SYSTEM FOR SELECTIVELY RECORDING FROM A PLURALITY OF VIDEO SOURCES AND METHOD THEREOF

BACKGROUND OF THE INVENTION

1. Field of the Invention

The present invention is related with adaptive video recording and reproducing systems. Video signals, which are outputted from two or more video sources, such as a video camera etc., are inputted to the system. The system switches the video signals, and records it to a recording medium of random access type etc. by a field unit or a frame unit. The system reproduces selectively the image of the video source.

2. Description of the Related Art

There is a security system, in which two or more video cameras are installed for the purpose of superintendence, such as a crime prevention, and each video image is monitored. In such a system, an apparatus for simultaneously recording two or more video images and reproducing them later for the verification etc. in the future, is required. As a system to which the output signals of two or more video sources, such as a video camera, are inputted, and records them, a construction having a plurality of recording devices whose number is equal to that of the video sources, may be considered. However, in this case, the apparatus constitution becomes large-scale, and the cost-up cannot be avoided.

In order to overcome such a problem, there is a transmitting, recording and reproducing method of two or more movable images by use of a time division technique, which is disclosed in the Japanese Patent Application Laying Open No. (Hei) 3-13190. Or, there is a recording and reproducing method disclosed in the Japanese Patent Application Laying Open No. (Hei) 3-190387. According to the method in the Japanese Patent Application Laying Open No. (Hei) 3-13190, the process is performed such that two or more movable image data are switched to a field or frame unit, and are transmitted as a single synthetic image data signal. The field or frame signal is separated from the received synthetic image data signal. By a counter, only the desired image data signal is written into a field or frame memory, so that the target movable image data is reproduced. On the other hand, according to the method disclosed in the Japanese Patent Application Laying Open No. (Hei) 3-190387, the process is performed such that two video signals are switched for every field, and are recorded onto a magnetic tape. At the time of reproduction, only one image is reproduced independently, by the cycle of field-switching at the time of recording.

However, there are the following problems in these methods mentioned above. Namely., it switches two or more video signals for every field, and generates a single synthetic video signal. It records the generated signal, sequentially and continuously on the magnetic tape. Alternatively, it only transmits the signal and selectively displays it. Therefore, by selecting the desired video image by a fixed timing, the reproduction of the movable image can be performed relatively easily. However, it is hard to treat the video image by a field unit or a frame unit. It is not easy to carry out various displays etc. in the recording and reproducing operations, such as a security system and a central managing system.

Moreover, in case of recording to the magnetic tape, it is not easy to control to access the image of the desired frame independently from the recorded physical position, so that the long access time is also needed. Further, in case of such a usage that, for example, the number of video sources, such as the number of the installed video cameras, are changed, the greatest recording area must be always set and prepared, so that, when the number of input is few, the futility arises in the recording area.

Secondly, by the security system or the central managing system, such a case often arises that there is no change in the object to monitor. For this reason, the still image without any change is recorded continuously, so that the futility arises in the recording area, too.

SUMMARY OF THE INVENTION

It is therefore an object of the present invention to provide adaptive video recording and reproducing systems, and adaptive video recording and reproducing methods, which make it possible to perform various displays speedily and easily in a security system, a central managing system etc., and to perform the recording and reproducing operations efficiently corresponding to the change in the number of the input of the video sources or corresponding to the still image, with little or no futility.

According to the present invention, the above mentioned object can be achieved by a first adaptive video recording system for selectively recording a plurality of video signals outputted from a plurality of video sources one after another. The first adaptive video recording system is provided with: a recording medium, to which at least the video signals and recording information data related to the video signals, are recorded by a field or frame unit in a randomly accessible manner; a recorder for recording the video signals and the recording information data related to the video signals, to the recording medium; and a switcher, coupled to the video sources and the recorder, for switching and outputting the video signals from the video sources to the recorder.

According to the present invention, the above mentioned object can be also achieved by a second adaptive video recording system for extracting a plurality of image data from one image data, and selectively recording the extracted image data one after another. The second adaptive video recording system is provided with: a recording medium, to which at least the video signals and recording information data related to the video signals, are recorded by a field or frame unit in a randomly accessible manner; a recorder for recording the video signals and the recording information data related to the video signals, to the recording medium; and an image extractor for extracting a plurality of image data from the one image data, and outputting the extracted image data as the video signals to the recorder one after another.

According to the present invention, the above mentioned object can be also achieved by an adaptive video reproducing system provided with: a recording medium, to which at least video signals and recording information data related to the video signals, are recorded by a field or frame unit in a randomly accessible manner; a reproducer for reproducing the video signals and the recording information data recorded on the recording medium; and a reproduction controller for reproducing the recording information data recorded on the recording medium, and controlling a reproduction of the video signals recorded on the recording medium on the basis of the reproduced recording information data by the field or frame unit.

According to the present invention, the above mentioned object can be also achieved by an adaptive video recording method for selectively recording one after another at least one of a plurality of video signals outputted from a plurality of video sources and a plurality of video signals corresponding to a plurality of image data extracted from one image data. The recording method includes the steps of: reading out recording information data from a recording medium, to which at least the video signals and the recording information data related to the video signals are recorded in a randomly accessible manner according to an operation indication for record start; determining a record starting address at which recording is to be started on the basis of the read out recording information data; selecting one after another the video signals on the basis of a predetermined condition; recording the selected video signals to the recording medium from the determined record starting address; stopping recording the video signals according to an operation indication for record stop; and recording the recording information data related to the recorded video signals to the recording medium.

According to the present invention, the above mentioned object can be also achieved by an adaptive video reproducing method including the steps of: reading out recording information data from a recording medium, to which at least video signals and the recording information data related to the video signals are recorded in a randomly accessible manner, according to an operation indication for reproduction; and reproducing the video signals recorded on the recording medium on the basis of the read out recording information data.

According to the first and second adaptive video recording system of the present: invention, two or more video signals are switched by the switcher to a field unit or a frame unit, or, two or more image data are extracted one after another from one image data. The switched or extracted video signal, is recorded to the recording medium, which can be randomly accessed by use of the address, by the field unit or the frame unit, and the recording information data, which relates to the video signal to be recorded, is also recorded to the recording medium.

According to the adaptive video reproducing system of the present invention, the video signal and the recording information data, which relates to the video signal, are read out from the recording medium, which can be randomly accessed by use of the address, by the field unit or the frame unit of the video signal. The reproduction conditions are set up by the recording information data, and the video signal can be reproduced according to thus set condition.

In one aspect of the present invention, the first adaptive video recording system is further provided with a video change detector, coupled to the video sources and the switcher, for detecting a video change as for each of the video signals, the switcher switching and outputting the video signal, which has the video change detected by the video change detector, to the recorder. In this case, two or more video signals inputted from the video sources, such as a video camera, for example, are switched by the switcher to the field unit or the frame unit. The video signal is outputted to a recorder one after another, and is recorded to the recording medium. Here, only the video signal, which includes a video change detected by the video change detector, is switched in the switching operation by the switcher. This video signal is outputted one after another, and is recorded to the recording medium. For example, firstly, each video signal is switched to one frame unit, and is recorded. After that, the video signal is switched and is recorded, only when the video image of each video signal changes. And, as for each video signal, the time, which has not been recorded because the video image is still, is recorded as the recording information data, in association with the video signals. Thereby, in the reproduction, the recorded video signal of 1 frame, is repeatedly reproduced continuously during the still time i.e. while the video image is still. Therefore, it becomes possible to precisely reproduce an actual phenomenon with respect to the time. Since the video signal of the time when the video image is standing still, is not recorded, recording to the recording medium can be performed efficiently, so that the recording time to one recording medium can be made longer.

In another aspect of the present invention, the second adaptive video recording system is further provided with a change point detector for detecting a change point of display information in one image data, the image extractor selecting from the extracted image data, which corresponds to the change point of the display information detected by the change point detector, and outputting the selected image data as the video signals to the recorder one after another. In this case, the second adaptive video recording system is suitable for the case of dividing high resolution image data, such as computer graphics, and recording each data as a video signal. Namely, two or more image data are extracted by the image extractor from the original image data by use of the predetermined division information. Each picture data is selected and is outputted to a recorder as the video signal. On the other hand, the change position of original-image data, for example, display information updated partially, is detected by the change position detector. Then, only the extracted image data which change has been detected, according to the change position information detected by the change position detector, is selected, and is outputted to the recorder as the video signal. Therefore, the extracted still image data, is not recorded, so that the recording time to one recording medium can be made long.

The nature, utility, and further features of this invention will be more clearly apparent from the following detailed description with respect to preferred embodiments of the invention when read in conjunction with the accompanying drawings briefly described below.

DETAILED DESCRIPTION OF THE
PREFERRED EMBODIMENTS

Hereinbelow, with reference to drawings, the embodiments of the present invention will be explained.

First Embodiment

Figure 1:
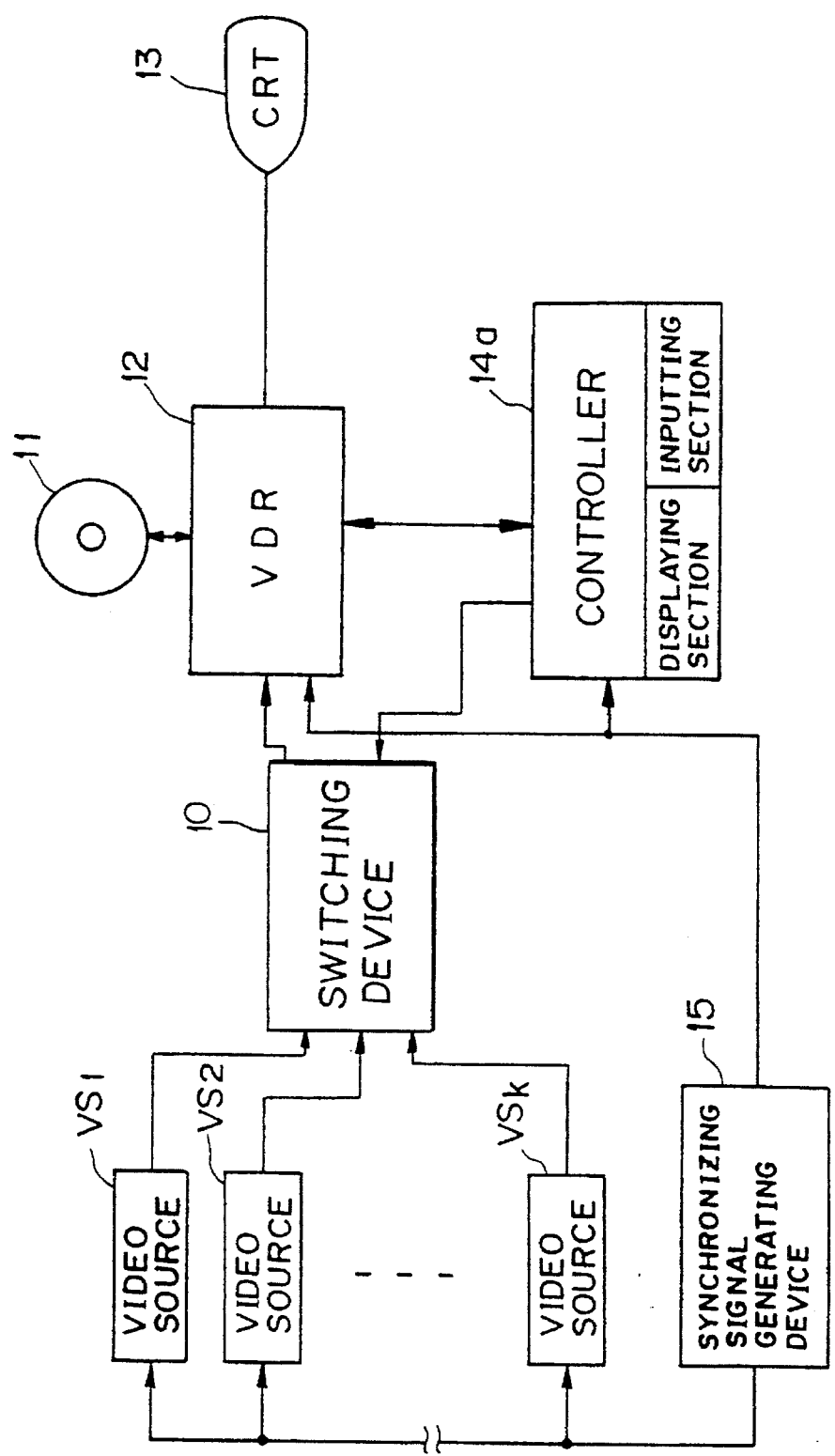
FIG. 1 is a block diagram of an adaptive image recording and reproducing system of a first embodiment according to the present invention.

FIG. 1 is a constitutional figure of an adaptive image recording and reproducing system of a first embodiment of the present invention. As shown in FIG. 1, an adaptive image record and reproduction system of the present embodiment is provided with a plurality of video-sources VS1 to VSk, a switching device 10, a video disc 11, a rewritable type video disc recorder 12 (hereinbelow, it is called as a "VDR"), a CRT 13 (Cathode Ray Tube), a controller 14a and a synchronizing signal generating device 15.

The output signals of those video-sources VS1 to VSk, are inputted into the switching device 10. The switching device 10 switches these signals for every frame, and outputs the signals one after another. The video disc 11 is an optical recording medium, which can be rewritten. The rewritable type video disc recorder 12 performs record and reproduction of the video signal to and from the video disc 11. The CRT 13 displays a video image. The controller 14a is provided with an operation displaying section and an operation inputting section, and controls the switching device 10 and the VDR 12. The synchronizing signal generating device 15 outputs a synchronizing signal to the video-sources VS1 to VSk, the VDR 12, and the controller 14a.

In the above-mentioned constitution, the video-sources VS1 to VSk are video reproducing apparatuses such as a video camera, a videotape recorder, and a tuner of television, for example. The video disc 11 is an optical memory, to which the recording and reproducing operations are performed by the magneto-optical method, for example.

Figure 2:
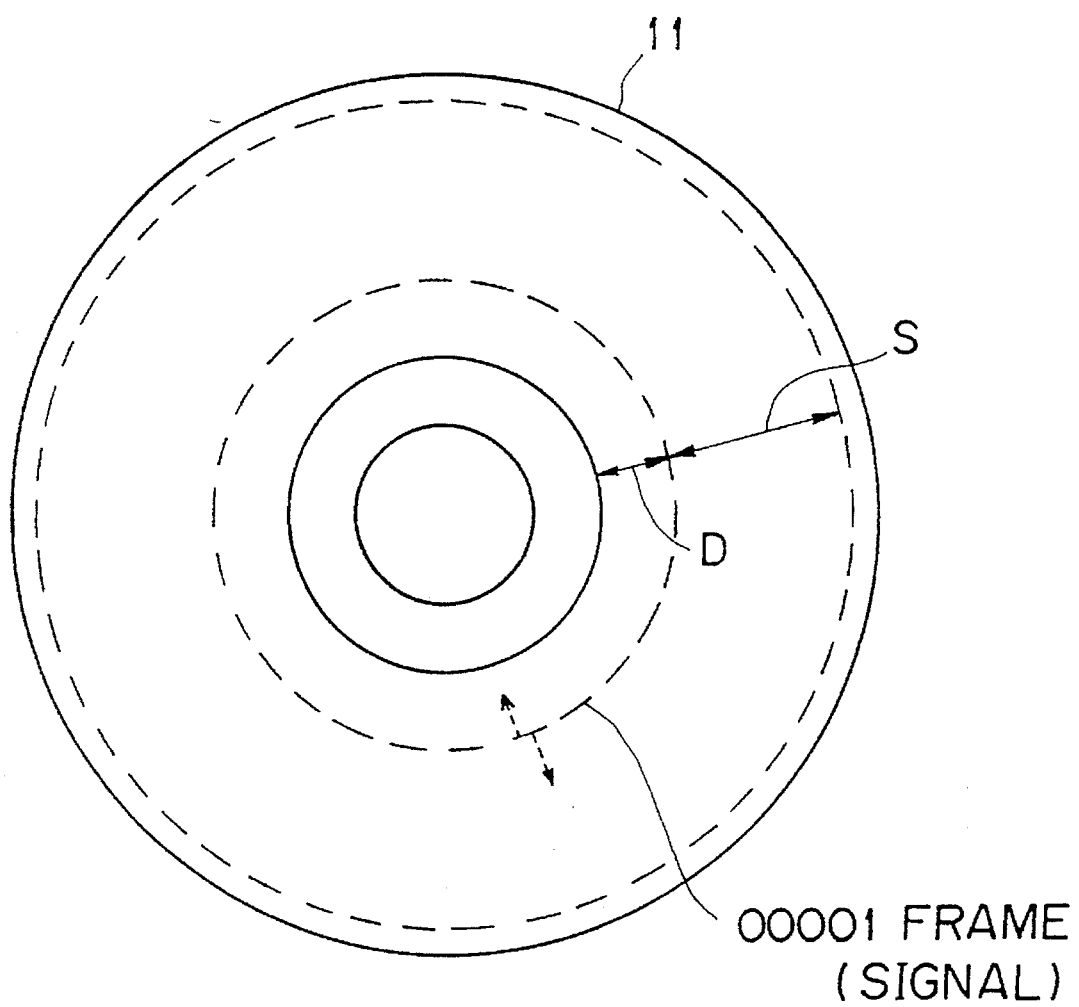
FIG. 2 is a diagram of a video disc of the first embodiment.

As shown in FIG. 2, there is prepared in the recording area, a signal area S to which the video signal and the PCM (Pulse Code Modulation) audio data are recorded, and a data area D to which the information, such as the contents of record, is recorded. There is prepared in the signal area S, an area to which 1 frame of the video signal is recorded, per 1 track. There is prepared in the data area D, an area to which the information equivalent to 1000 frames (500k words) of the video signal, is recorded. Address information (track number, sector number etc.) is pre-formatted on the disc. Thus, the random access is enabled at the time of recording and reproducing. The address information is recorded by means of modulation of the groove position, and is not recorded in the specific position of the disc. As for the address information, the same data is repeatedly recorded all over the circumference. Thus, the .address can be immediately recognized without waiting for one rotation of the disc. Moreover, the clock information required at the time of recording, is also pre-formatted. The timing of recording is synchronized with thus recorded clock.

In FIG. 1, the VDR 12 is connected to the controller 14a by the RS-232C. The recording and reproducing position of the VDR 12 to the video disc 11, is controlled by the control information from the controller 14a. The VDR 12 records the information sent from the controller 14a, to the data area D. The VDR 12 sends out the reproduction information from the data area D to the controller 14a. The VDR 12 is provided with an A/D (Analogue to Digital) convertor, a D/A (Digital to Analogue) converter, a frame memory, etc. to perform the record of the video signal by compressing the component signal about a time-axis. The VDR 12 is also provided with two independent optical pickups for erasing and recording, to increase the operation speed of recording and reproducing, such that two optical pickups can be simultaneously operated in reproduction. Therefore, the video images recorded in remote tracks can be reproduced continuously, by moving one optical pickup to the next track while the other optical pickup is reproducing the present track.

Nextly, the operation of the first embodiment constituted as mentioned above will be explained.

(1) Recording Operation

When the system is started and the operation indication for recording, is given, the controller 14a starts the VDR 12. The controller 14a reads out the information recorded on the data area D, and detects the record starting address on the video disc 11. Nextly, the controller 14a outputs the detected starting address information to the VDR 12, to make it in a stand-by condition. Successively, the controller 14a outputs the record starting signal to the switching device 10 and the VDR 12. When the record starting signal is inputted, the output signals of the video-sources VS1 to VSk, are inputted to the switching device 10 one after another, by switching the output signals one after another for every frame. The switching device 10 outputs the switched signal to the VDR 12 as a single synthetic video signal. The system may be constituted such that an operator can select in advance an objective video source to be switched. When the inputting operation of the output signal of the video-source VSk is finished, successively, the inputting operation of the output signal of the video-source VS1 is performed again, and this operation is repeated until the operation indication for stopping is inputted. The synthetic video signal outputted from the switching device 10, is sequentially recorded by the VDR 12. At this time, the controller 14a counts the number of recorded frames, by the synchronizing signal. Namely, if the series of records until the output signal of the video-source VSk, is completed once, the controller 14a counts it as 1 block. Here, the video source number is expressed by "k" block number is expressed by "n", and the frame No. is expressed by {kn+(1, 2, 3, ..., k)}.

At the time of starting the recording operation, the controller 14a generates the time code, which expresses the time for every frame, and the ,data, which expresses a frame number (hereinbelow, it is expressed by "frame No."). The system can record these data with the video signal, which should be recorded to the signal area S, onto the video disc 11.

Figure 3:
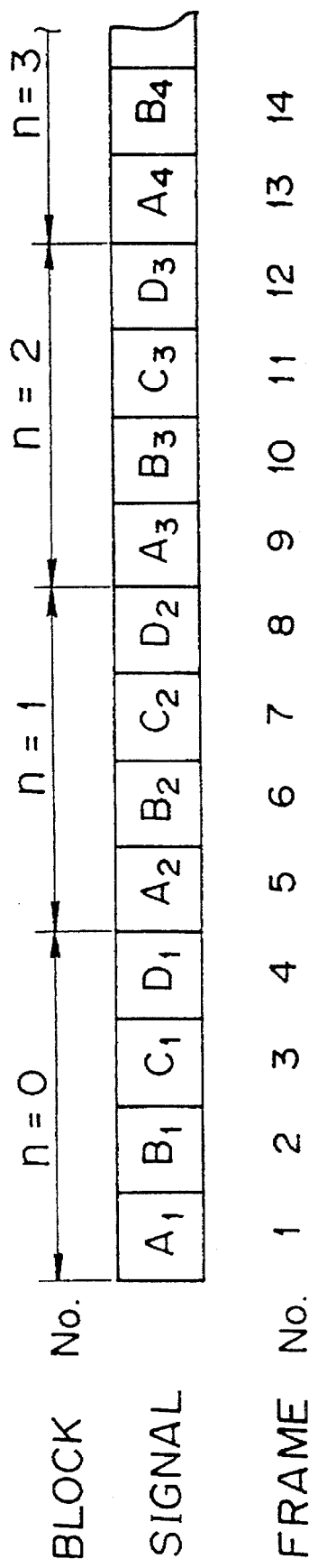
FIG. 3 is a diagram showing a synthetic video signal of the first embodiment.

FIG. 3 is a diagram of a synthetic video signal, which is switched and recorded for every frame. Here, for simplification of explanation, the video source number is assumed to be 4 (k=4), and each signal is shown as A, B, C, and D. Firstly, when the signal is recorded from the frame A1 to the frame D1 (frame No. 1 to 4), the block-number n=0 is counted. Nextly, when the signal is recorded from the A2 to the frame D2 (frame No. 5 to 8), the block-number n=1 is counted. Similarly, when the record of the frames from A to D is completed once, the controller 14a performs the count for increasing the block number by one. Therefore, (block-number +1) becomes the number of frame to which the output signal of one video source is recorded.

When the operation indication for stopping is inputted, the controller 14a outputs a stop signal to the switching device 10 and the VDR 12, to stop the recording operation. Then, the controller 14a controls to record the record starting address, the inputted video-source-number k, the recording-block-number n, the time at the time of record start, etc., as the recording information data to the data area D of the video disc 11, to complete the recording operation.

(2) Reproducing Operation

Nextly, the reproducing operation of the first embodiment will be explained.

In FIG. 1, When the operation indication for reproducing is given, the controller 14a controls the VDR 12 to read out the recording information data of the data area D. Then, the controller 14a selects the record to be reproduced on the basis of the time, file name etc. indicated by the recording information data. The controller 14a obtains the information of the record starting address, the video-source-number k, and the recording-block-number n. And, the controller 14a obtains the frame No. (kn+i) of the frame to be reproduced, one after another as for the block No. 0 to n, from the number i (=1 to k) of the video source to which the reproduction is indicated. Then, the controller 14a sends the obtained frame No. to the VDR 12 one after another. The controller 14a controls the reproduction of the record signal of the indicated video source. This operation will be explained here in detail, with reference to FIG. 3. For example, when the operation indication for reproducing the record image of the video-source A (i=1) is given, the frame No. as for the block No. 0 to n is obtained one after another (4n+1=1, 5, 9, ... ).

The Second Embodiment

Figure 4:
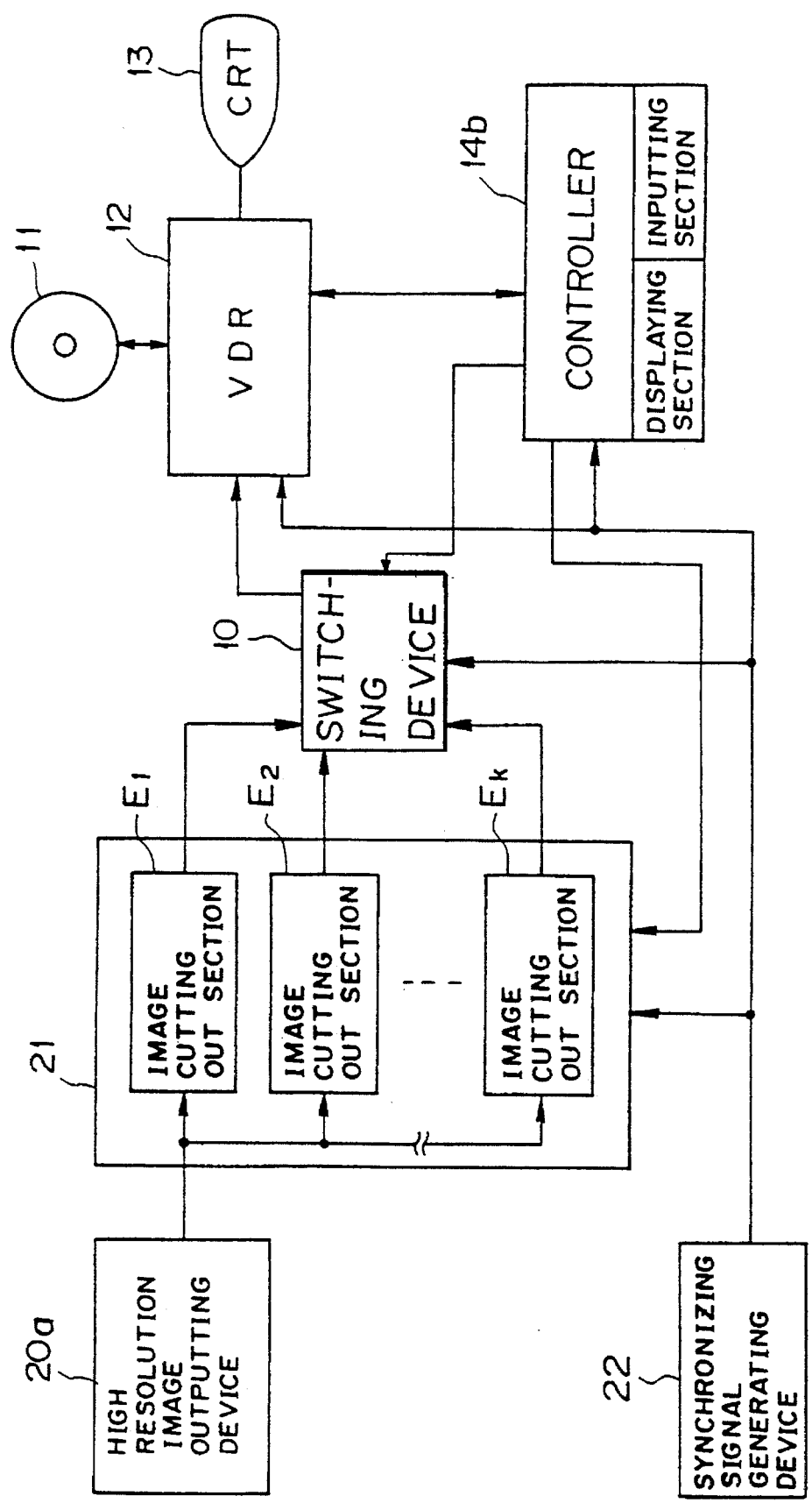
FIG. 4 is a block diagram of an adaptive image recording and reproducing system of a second embodiment according to the present invention.

FIG. 4 is a constitutional figure of an adaptive image recording and reproducing system of a second embodiment of the present invention. This second,embodiment is constituted such that divided images of a high resolution image, are inputted as the signals from the plurality of video sources to input. In FIG. 4, the same constitutional elements as those in FIG. 1, carry the same reference numerals and the detailed explanation thereof are omitted.

In FIG. 4, the recording and reproducing system is especially provided with a high resolution image outputting device 20a, an image dividing device 21, and a synchronizing signal generating device 22. The high resolution image outputting device 20a is, for example, a display apparatus (a computer graphics, a display device of a terminal apparatus, etc.) of a computer system. The image dividing device 21 is controlled by the controller 14b to divide the image output of the high resolution image outputting device 20a. The synchronizing signal generating device 22 outputs a synchronizing signal, which becomes the standard of the operation of the image dividing device 21, the switching device 10, and the VDR 12. Other constitutions are the same as that of the first embodiment. The image dividing device 21 has a plurality of image cutting out sections E1 to Ek. The image dividing device 21 divides the high resolution image of, for example, 1024×512 dots into a plurality of images, and outputs each divided image, as a video signal of the current standard television method. The number of the image cutting out sections, is determined according to a required processing rate or speed. When the number of the image cutting out section is one, the switching device 10 is not required.

Such a system is utilized to back up graphics images which indicate a production process, in preparation for the time of accident in a concentration management system in a factory, for example.

The Third Embodiment

Figure 5:
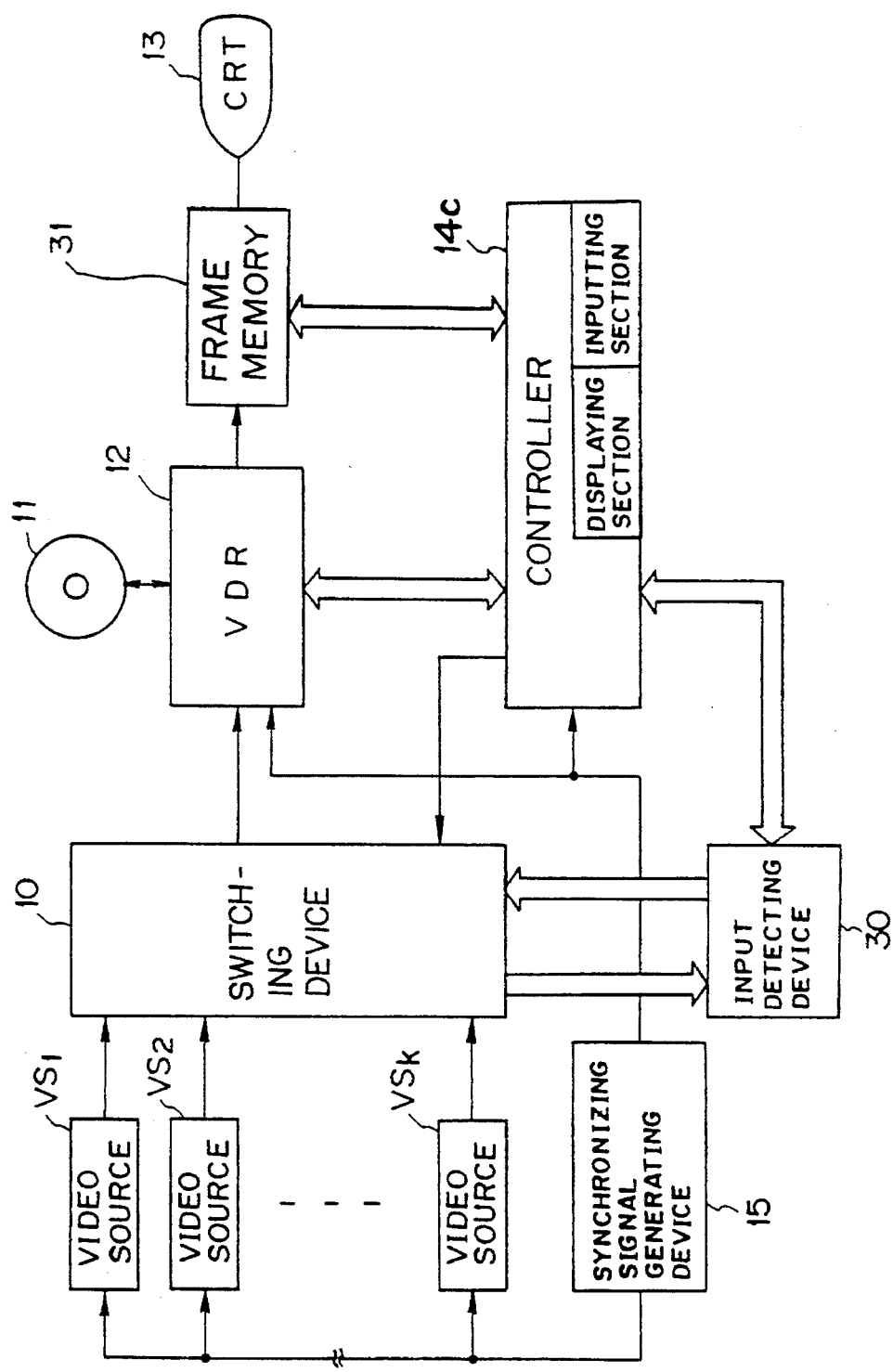
FIG. 5 is a block diagram of an adaptive image recording and reproducing system of a third embodiment according to the present invention.

FIG. 5 is a constitutional figure of an adaptive image recording and reproducing system of a third embodiment of the present invention. In FIG. 5, the same constitutional elements as those in FIG. 1, carry the same reference numerals and the detail explanations thereof are omitted. The third embodiment is provided with an input detecting device 30 and a frame memory device 31. The input detecting device 30 is a device for detecting the existence of the input from the video source. The frame memory device 31 is a device for performing a multiple picture plane display in reproduction.

Firstly, the operation related to the input detecting device 30 will be explained. The input detecting device 30 inspects each input of the switching device 10. The input detecting device 30 detects whether the video signal from the video source is inputted or not, by the existence of the synchronizing signal, for example. This detection result is recognized by the switching device 10. The setup of the switching device 10 is performed so as not to switch with respect to the input point where there is no video signal. When the operation indication for recording is inputted, the controller 14c obtains the detection result from the input detecting device 30. The controller 14c stores the number of the video sources which input the video signals, and counts the block number corresponding to the number of the video sources.

Thus, the input state of each video source, is automatically detected. For example, in case that the plurality of the television cameras are installed in the superintendence system, the record may be performed only as for the video source, which is reacted to a close approach of a human being or a commodity. Recording as for the video source in which there is no video signal output, can be avoided, so that a blank frame is not generated, and no or little futility is generated. It may be constituted such that the video source is selected by the controller side.

Figure 6:
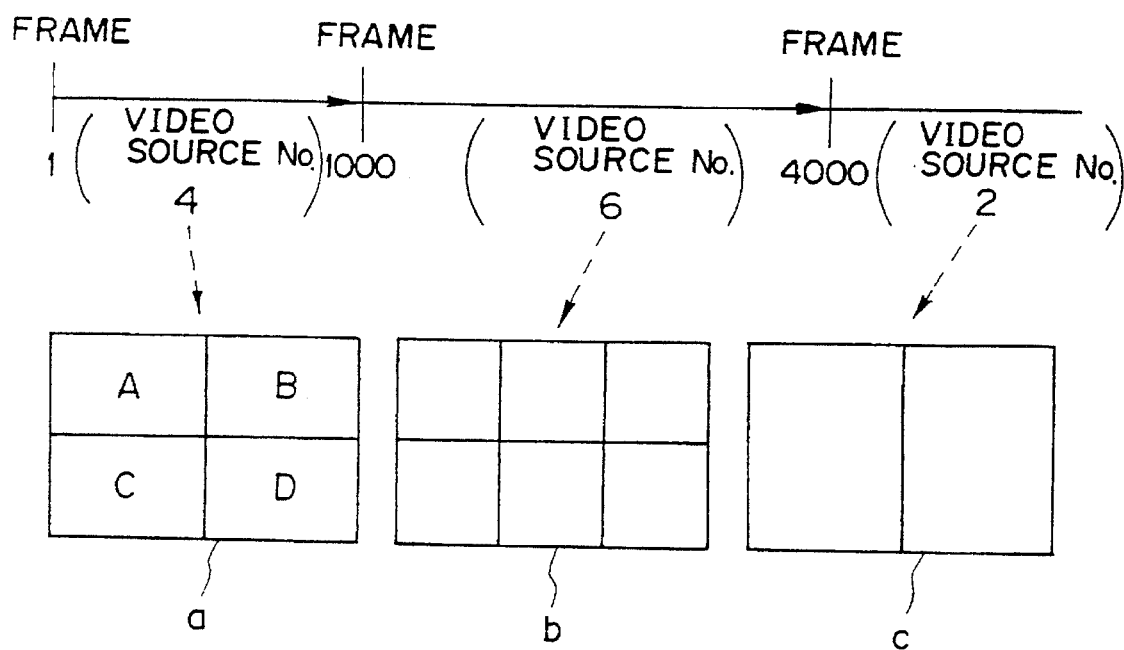
FIG. 6 is a diagram showing a multiple picture plane display of the third embodiment.

Nextly, the multiple picture plane display at the time of reproduction will be explained. In the present embodiment, as shown in FIG. 6, a video source number is assumed to be 4, for example, in the reproduction from the frame No. 1. When the operation indication for performing the multiple picture plane display, is inputted, the controller 14c displays four images in one display picture plane, as indicated by the display picture plane a in FIG. 6. The picture data outputted one after another from the VDR 12, is reduced by the size corresponding to the dividing number, and is written at the address of the frame memory in the frame memory device 31 corresponding to the video source. By those operations, image synthesizing is performed. Here, it is assumed that the four video sources are A, B, C and D as shown in FIG. 3.

In FIG. 3, firstly, the frame of A1 of the block No. 0, is reproduced, and the picture data is inputted and reduced. The picture data is developed to the predetermined area of the frame memory device 31. Then, the signals B1, C1 and D1 are reproduced in the order, and are processed in the same manner. As a result, when one picture plane is synthesized, it is outputted to the CRT. This state is held until the synthetic image of the next block is outputted. Nextly, the signals A2, B2, C2 and D2 of the block No. 1, are reproduced and reduced. The contents of the frame memory of the frame memory device 31 are updated. The images of the four video sources reduced and synthesized in this manner, are reproduced one after another on one picture plane. In FIG. 6, the video source number of the frame No. 1000 changes from 4 to 6, and the video source number of the frame No. 4000 changes from 6 to 2. When detecting the change by obtaining the data of the video source number from the data area at the time of reproduction, the dividing number may be changed to 6 like a display picture plane b. Further, it may continuously reproduces by automatically changing to 2, as the display picture plane c of FIG. 6.

In the above mentioned first embodiment (FIG. 1) and third embodiment (FIG. 5), an external synchronization can be applied to the television camera or the VTR as the video source device, by the synchronizing signal generating device 15. However, in case of employing a video source to which the external synchronization cannot be applied, the same effect can be obtained by installing, for example, a frame-synchronizer on the input side of the switching device 10. If waiting time is admitted, it is enough to install just one frame-synchronizer on the input side of the VDR 12.

In the recording control of the above-mentioned embodiments, the writing operation of the recording information data to the data area D is executed when the operation indication for record-stop is given. However, the present invention is not limited to this, but it may be constituted to temporarily store the recording information data in the RAM of the controller, and write at once all of the data when the recording operation for all of the record is completed, or write the data each time when a predetermined time interval is elapsed, or each time when the number of the sources of the video signal is changed, for example.

In the above mentioned embodiment, the recording and reproducing operations are performed in real time. Namely, the operations are performed without the interval between two frames. However, it may be constituted to perform the recording and reproducing operations with the interval as occasion demands.

In the security system etc., a continuous recording operation is necessary, while the recording capacity of the video disc used in the above mentioned embodiment is limited. Thus, the system may be preferably constituted such that it keeps on recording endlessly by suitably overwriting if only a short backup time is sufficient.

Though the VDR is the image recording and reproducing apparatus, and the video disc is the recording medium in the above mentioned embodiments, it may be such a type as can be randomly accessed. Moreover, the record and reproduction may be performed by the field unit in place of the frame unit.

As described above in detail, the video signal can be recorded to the recording medium of random access type, and can be processed by the field unit or the frame unit, so that various displays such as a multiple picture plane display, can be easily and speedily performed, and recording can be performed efficiently corresponding to the change in the input number of the video sources, according to the first to third embodiments.

The Fourth Embodiment

Figure 7:
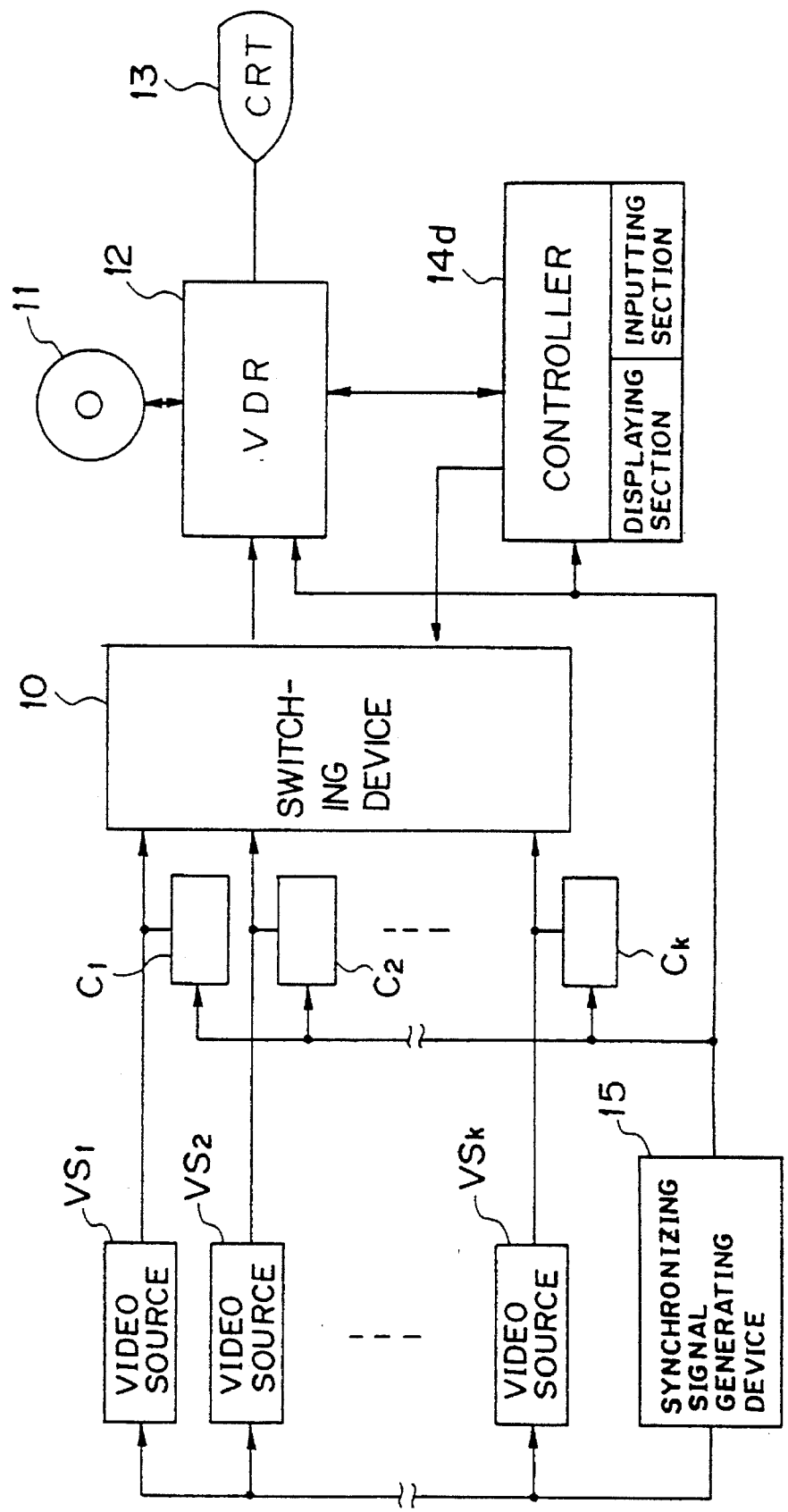
FIG. 7 is a block diagram of an adaptive video recording system of a fourth embodiment according to the present invention.

FIG. 7 is a constitutional figure of an adaptive image recording and reproducing system of the fourth embodiment of the present invention. In FIG. 7, the same constitutional elements as those in FIG. 1, carry the same reference numerals and the detailed explanations thereof are omitted.

As shown in FIG. 7, the adaptive image recording and reproducing system of the fourth embodiment, is provided with a plurality of video sources VS1 to VSk, a switching device 10, a video disc 11, a VDR 12, a CRT 13, and a synchronizing signal generating device 15. Especially, the fourth embodiment is provided with a plurality of video change detecting devices C1 to Ck, to which the video signals outputted from the video sources VS1 to VSk are inputted. The video change detecting devices C1 to Ck detect the change of the image. The fourth embodiment is further provided with a controller 14d. The controller 14d has an operation displaying section and an operation inputting section. The controller 14d controls the video change detecting devices C1 to Ck, the switching device 10 and the VDR 12.

In the present embodiment, the control is performed so that the record and reproduction of the video signal is performed by 1 frame unit.

Figure 8:
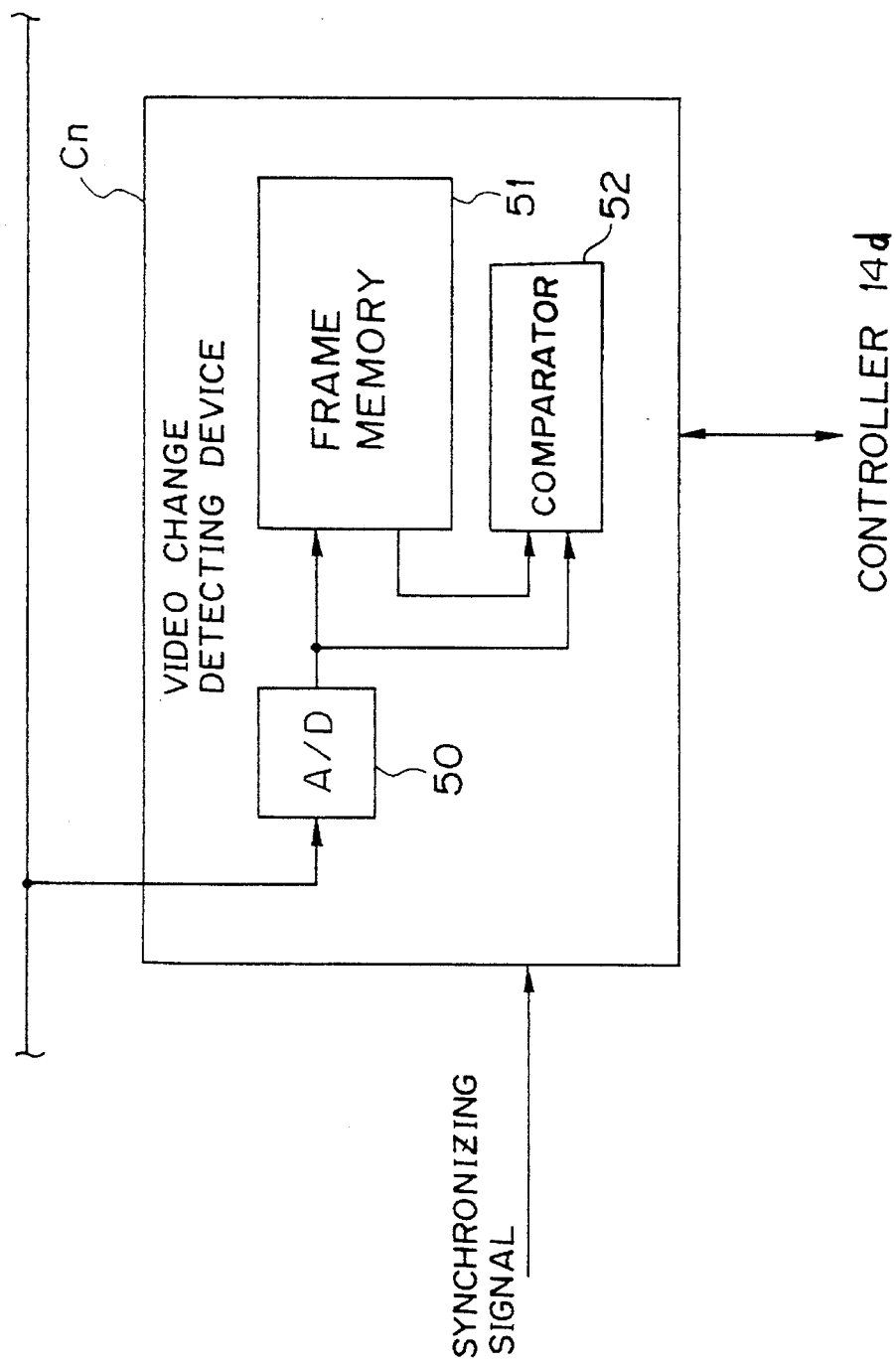
FIG. 8 is a block diagram of a video change detecting device of the fourth embodiment.

FIG. 8 shows the constitution of the video change detecting devices C1 to Ck. As shown in FIG. 8, the video change detecting device Cn (n is the integer of 1 to k) has an A/D converter 50, a frame memory 51, and a comparator 52.

The video signal is inputted to the A/D converter 50. The A/D converter 50 converts it to the digital information. The frame memory 51 stores the video information outputted from the A/D converter 50 by 1 frame unit. The comparator 52 compares the video information stored in the frame memory 51 and the newly inputted video information. The record indicating signal is inputted from the controller 14d to each of the video change detecting devices C1 to Ck. Each of the video change detecting devices C1 to Ck, outputs the detection result of the video change to the controller 14d.

When the record indicating signal is inputted from the controller 14d, each of the video change detecting devices C1 to Ck, stores the video information of one frame, which is inputted at the moment, to the frame memory 51, and holds it. When the video information is stored to the frame memory 51, the comparator 52 begins the comparing process on the basis of the synchronizing signal. The comparator 52 reads out, in synchronism with the video information output timing after the next frame outputted from the A/D converter 50, the corresponding video information from the frame memory 51. The comparator 52 performs the comparison between this read out information and the video information, which the A/D converter 50 outputs one after another. When the comparison of the video information of 1 frame is completed, the comparator 52 judges whether or not there is a change, in the video information of 1 frame, greater than the predetermined error range. If there is such a change in the video information, the comparator 52 outputs the signal, which indicates it, to the controller 14d. When the comparing process of 1 frame is completed, the comparator 52 repeats the comparing process one after another in the same manner about the video information of the following frame inputted to the comparator 52. In the controller 14d, the video change flag is set by the signal which indicates the existence of the change in the image. By this flag, it can be recognized whether or not there is the change in the image as for each video signal.

Nextly, the operation of the recording process of the video signal by the fourth embodiment will be explained.

(1) Recording Operation

In FIG. 7, when the system is started and the recording indication is inputted, the controller 14d firstly starts the VDR 12. The controller 14d reads out the information, which is recorded in the data area D, and detects the record starting address to record the video disc 11. Then, the controller 14d outputs the detected starting address information to the VDR 12, and controls the record starting position so as to set the VDR 12 in the standing by condition. Successively, the controller 14d, controls the switching device 10, the VDR 12, and the video change detecting devices C1 to Ck, to perform the record control of the video signal. At the time of record start, the output signals from the video sources VS1 to VSk, are switched by the switching device 10 one after another for every frame, and are outputted to the VDR 12. The video signal, which each of the video sources VS1 to VSk outputs, is recorded to the video disc 11 for every frame. In the recording operation of the video signal to the video disc 11, at the same time of switching of the switching device 10, the controller 14d outputs the record indicating signal to the video change detecting device which detects the video change in the video signal outputted to the VDR 12 at the moment. Thus, the video signal same as the video signal to be recorded to the video disc 11, is stored to the frame memory 51 of the video change detecting device.

Nextly, the controller 14d inspects the video change flag for every predetermined time. The controller 14d, controls the switching device 10 to switch the video signal of the video source, with respect to which the video change is detected, one after another for every frame, and output it to the VDR 12. The controller 14d controls the VDR 12 to record the output signal onto the video disc 11. At this time, the video change flag is reset at each time of recording. The record indicating signal is outputted to the video change detecting device, which detects the change of the video signal to be recorded as mentioned above. This signal is used as the standard of the comparison from the following frame. The controller 14d counts the block No. for every predetermined time, in connection with the above-mentioned recording process, and generates the recording information data including the block No. and the number of the video source recorded at the time of counting. The still video image, which video image is not recorded, can be reproduced in real time by use of the recorded video image by utilizing this recording information data.

When there is the operation indication for stopping, the controller 14d outputs the stop signal to the switching device 10 and the VDR 12, and stops the recording operation. Successively, the controller 14d controls to store the recording information data, the record starting address, the inputted video source number k, the recording block number n, and the time of record start etc., to the data area D of the video disc 11 as the video record information, and finishes the recording operation.

The system may be constituted so that the operator can select the video source to be the recording object beforehand as for the video source. Alternatively, the controller 14d may be constituted to generate the time code, which expresses the time for every frame, and the data which indicates the frame No., at the time of record start, and record those data with the video signal to be recorded to the signal area S.

Figure 9:
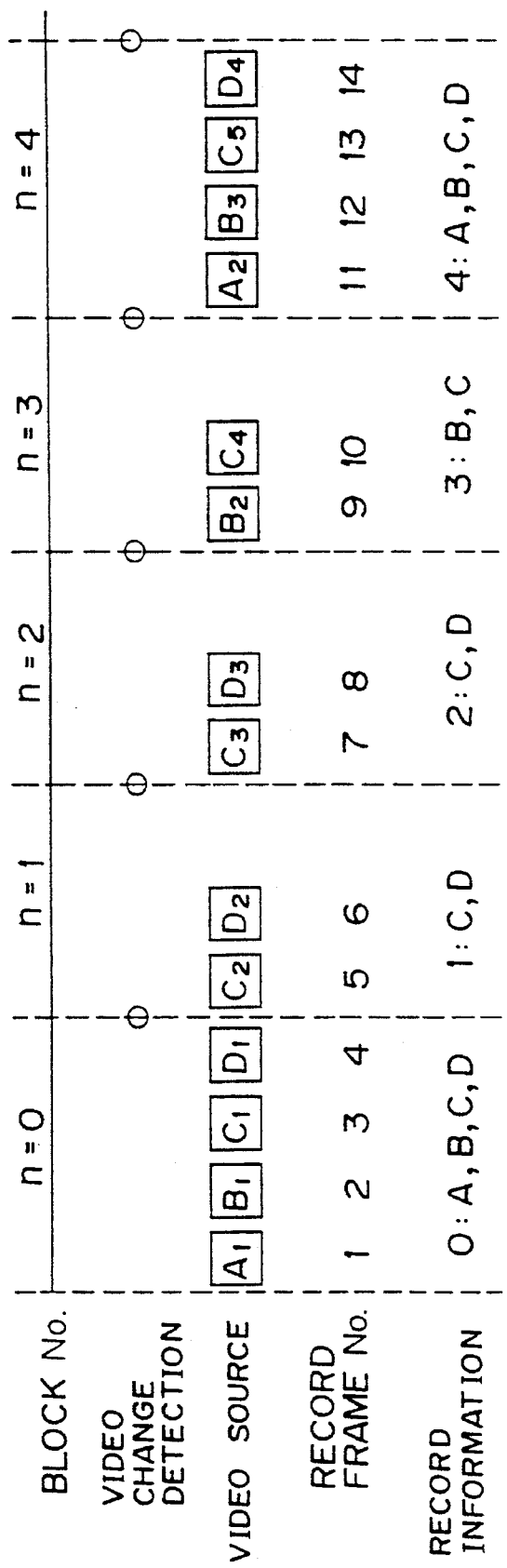
FIG. 9 is a diagram showing record and reproduction of a video signal of the fourth embodiment.

With reference to FIG. 9, the above-mentioned process will be explained concretely hereinbelow. It is assumed here that the video source number is 4 (k=4) for simplification of explanation, which source is respectively shown by A, B, C and D in the figure, and that the record of the video signal from each video source A, B, C and D, is performed by the record interval of 1 frame in 1 second. Firstly, at the time of record start, each frame A1, B1, C1, D1 (record frame No. 1 to 4) of each video source is recorded. The block No. n=0 is counted. Nextly, the block No. n=1 is counted in 1 second after the record. At the same time, the video change flag is inspected. As shown in FIG. 9, when the video sources C and D are changed, one frame C2, D2 (record frame No. 5, 6) of each video signal, is respectively recorded. Similarly, the block No. n=2 is counted in the next 1 second, and the video change flag is inspected. If each video source C, D has the change, each one frame C3, D3 (record frame No. 7, 8) of each video signal, is respectively recorded in the same manner. After that, the signal of the video source which has the change, is recorded every second as shown in FIG. 9, and, at this time, the block No. and the identification number of the recorded video source etc., are generated as the recording information data.

(2) Reproducing Operation

Nextly, the reproducing operation of the fourth embodiment will be explained hereinbelow. If there is given the operation indication for reproduction, the controller 14d controls the VDR 12 to read out the video record information currently recorded in the data area D. Successively, the controller 14d selects the record to be reproduced according to the indicated time or file name etc., obtains the video record information, and generates the reproduction information of the video source, which reproduction is indicated, from the recording information data. For example, when the record is carried out as in the chart (a) of FIG. 9, the reproduction information is generated as in the chart (b) of FIG. 9. As shown in FIG. 9, in the reproduction of the video source A, the record video image of 1 frame of the record frame No. 1 is reproduced for 4 seconds. Successively, the record video image of 1 frame of the record frame No. 11 is reproduced for 1 second. In the reproduction of the video source B, the record video image of 1 frame of the record frame No. 2 is reproduced for 3 seconds. Successively, the record video image of 1 frame of the record frame No. 9 is reproduced for 1 second, and the record image of 1 frame of the record frame No. 12 is reproduced for 1 second. In this manner, from the recording information data, the reproduction information as for the record frame No. to be reproduced and the time to reproduce, is generated for every video source, and the reproduction is performed by controlling the VDR 12.

For example, the system may be constituted to reproduce every time only the frame A for 0.5 second interval, i.e. perform a search-like reproduction.

In the present embodiment, it is presupposed that an external synchronization is applied to the television camera or the VTR as the video source device, by the synchronizing signal generating device 15. In the case where the video source, to which an external synchronization cannot be applied, is employed, for example, the same effect can be obtained by installing, for example, a frame synchronizer at the input side of the switching device 10. In addition, if the waiting time is admitted, it is enough to install just one frame-synchronizer at the input side of the VDR 12.

Furthermore, the present embodiment may be adapted to distinguish the existence of the video signal, in addition to detecting the change in the image by the video change detecting device, and informs the result of distinguishing to the controller. In this case, the controller controls so as not to perform switching to the video source having no video signal.

The video information, which becomes the standard in the video change detecting device, is held by the frame memory 51 in the present embodiment. The video information of the frame which became the detection object, is not stored, so that the video change is detected by the comparator 52, and as a result, another frame is recorded when the record of the video source is performed since the time has elapsed. However, this time gap is little, and does not cause any practical problem in such a usage that recording is performed about once per one second. However, in such a case that it is required to record more strictly the changed frame, the system may be preferably equipped with a frame memory and a D/A converter, so that the video information of the detection object frame is also held and recorded.

Moreover, as for the comparison method of the video information, the system may be adapted to average the data over several frames, in order to avoid erroneous or incorrect operation by the flicker of the light, or the noise of the video signal. Or, the system may be adapted to apply a filtering process so as not to respond to a small change. Various techniques of image processing, can be applied to the present embodiment.

The Fifth Embodiment

Figure 10:
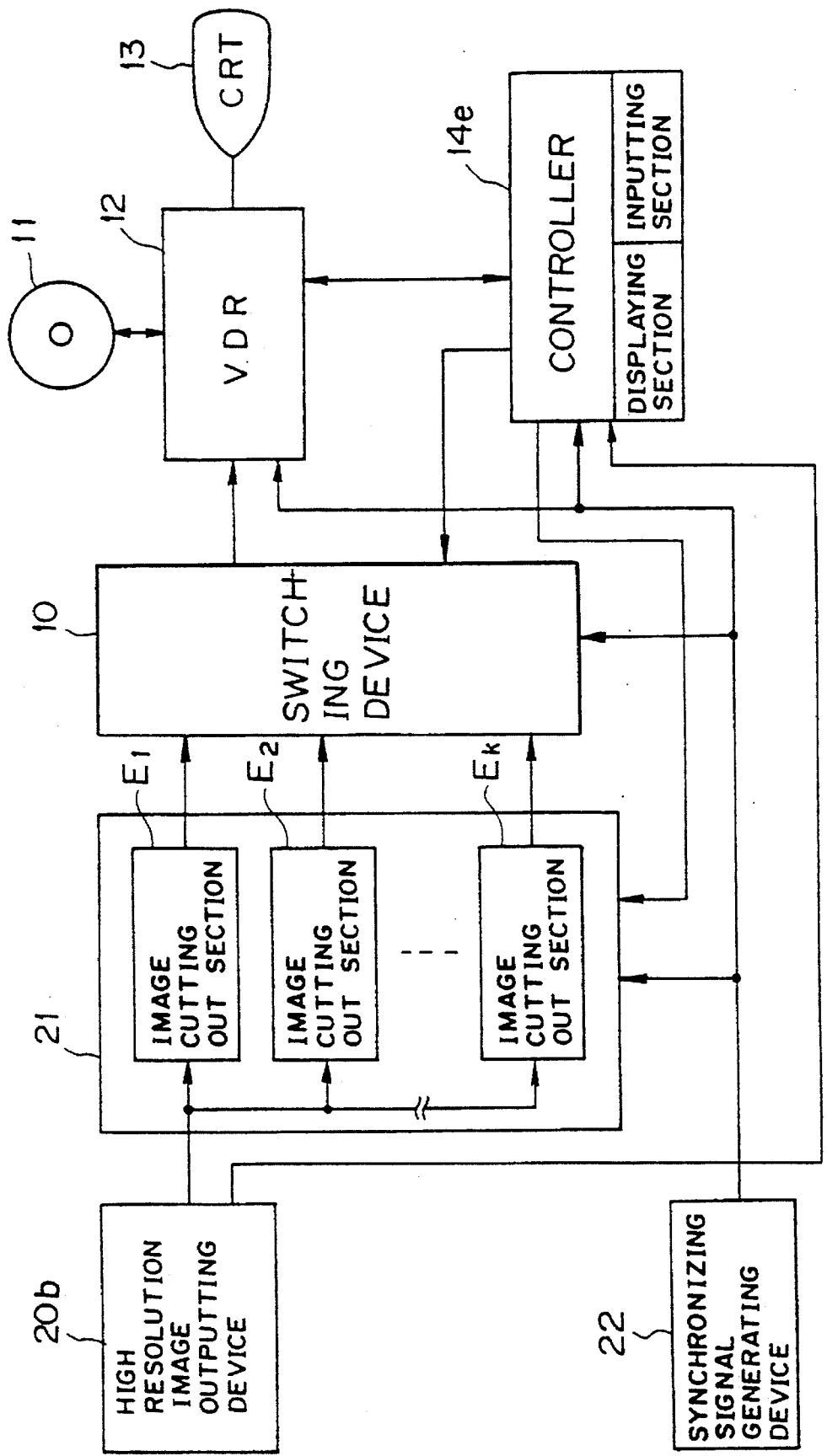
FIG. 10 is a block diagram of an adaptive video recording system of a fifth embodiment according to the present invention.

FIG. 10 shows a constitutional figure of an adaptive image recording and reproducing system of a fifth embodiment according to the present invention. The fifth embodiment is constituted such that an image, which is obtained by dividing a high resolution image, is inputted as one mode of the video sources to input. Such a system is used to back up a graphics image, which indicates a production process, in preparation for the time of accidents or abnormalities in a concentration management system in a factory.

In FIG. 10, the fifth embodiment is provided with similar constitutional elements as the second embodiment of FIG. 4. In FIG. 10, the same constitutional elements as those in FIG. 4, carry the same reference numerals and the detail explanations thereof are omitted.

The fifth embodiment is especially provided with a controller 14e and a high resolution image outputting device 20b. The high resolution image outputting device 20b is a display apparatus of a computer (a display device of a computer graphics or a terminal apparatus), for example. The image dividing device 21 divides the image output of the high resolution image outputting device 20b. The synchronizing signal generating device 22 outputs the synchronizing signal, which becomes the standard of the operations of the image dividing device 21, the switching device 10, and the VDR 12. The information of the image change position, which is outputted from the high resolution image outputting device 20b, is inputted to the controller 14e. The image change position information, is a writing-in address to the frame memory, which is provided in, for example, the high resolution image outputting device 20b. In the controller 14e, the change position in the image is detected by use of the writing-in address.

The image dividing device 21 has a plurality of image cutting out sections E1 to Ek, which divide the high resolution image of 1024×512 dots into a plurality of pieces, and outputs each as a video signal of the current standard television method. Each of the image cutting out sections E1 to Ek, cuts out a predetermined range of the image, which is outputted from the high resolution image outputting device 20b. In the switching device 10, the output of each of the image cutting out sections E1 to Ek, is switched for every frame, and is outputted to the VDR 12. The switching device 10 switches the video signal to output, to a frame unit on the basis of the signal from the controller 14e. The number of the image cutting out sections, can be set in accordance with the required processing rate or speed. If the number of the image cutting out sections is just one, the switching device may be omitted.

Nextly, the operation of the fifth embodiment will be explained hereinbelow.

Figure 11:
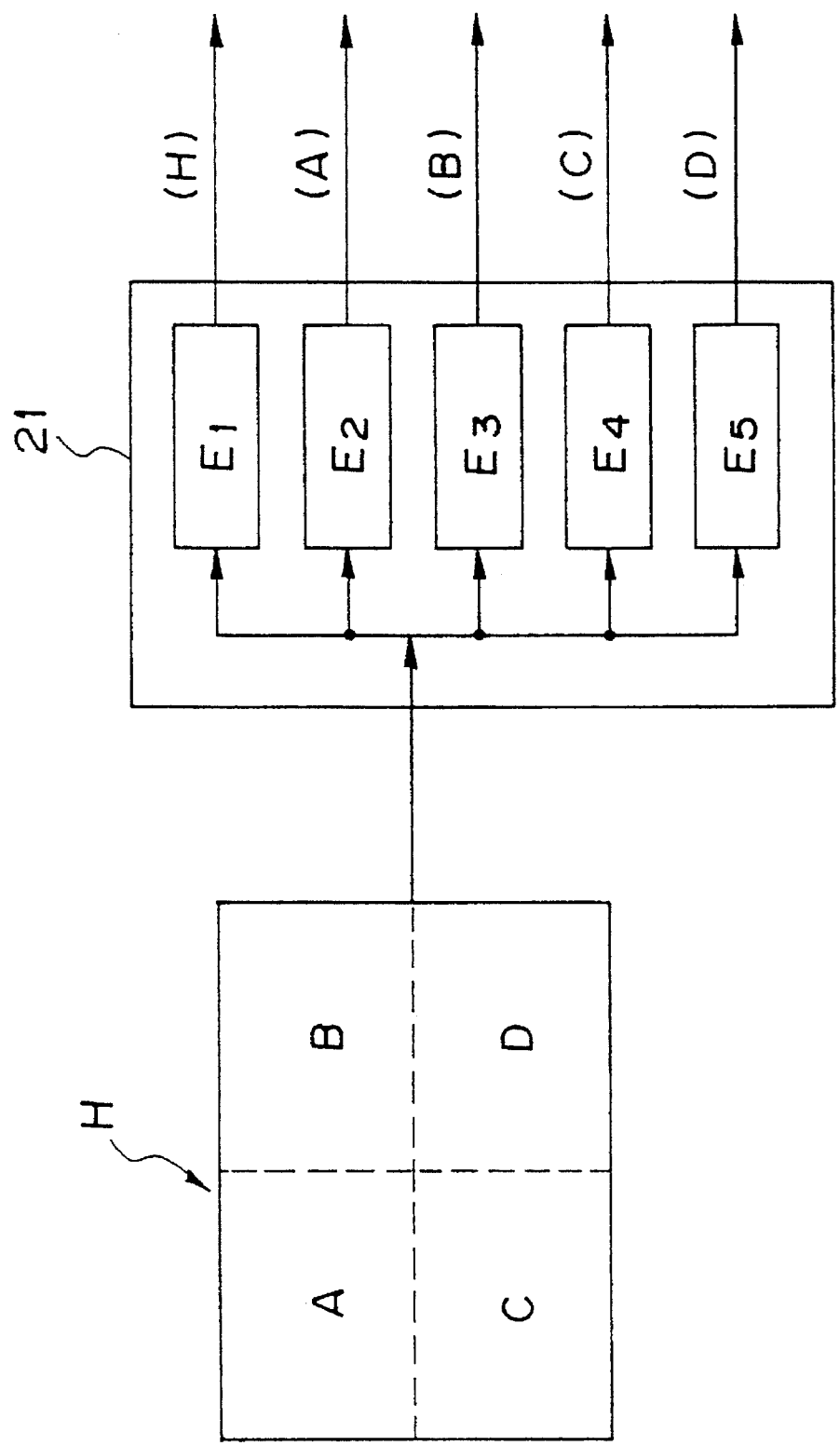
FIG. 11 is the diagram of a concrete constitution of a portion of the fifth embodiment.

Here, it is assumed that the image dividing device 21 is provided with five image cutting out sections E1 to E5. As shown in FIG. 11, the image cutting out section E1 cuts out the whole image, which is constituted by reducing the original image H of the high resolution, and which is outputted from the high resolution image outputting device 20b, and outputs it. The image cutting out sections E2 to E5, cut out and output each A, B, C, D image, which is obtained by dividing the original image H into four pieces. Each image is cut out every second.

Figure 12:
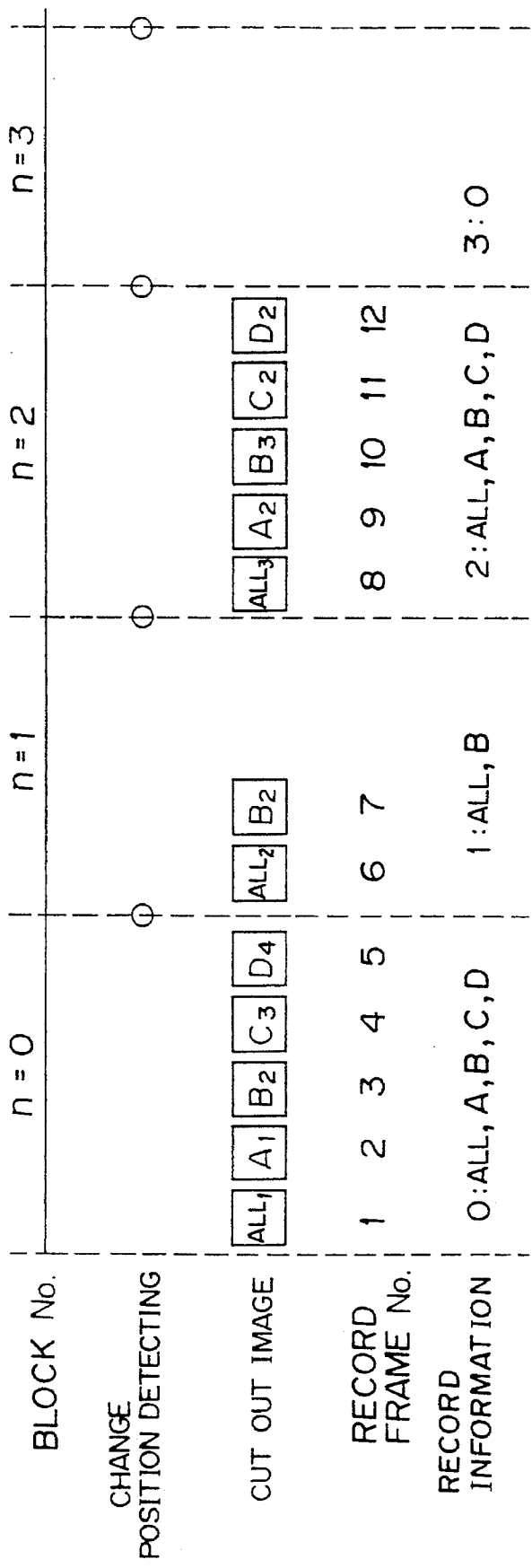
FIG. 12 is a diagram showing record and reproduction of the video signal of the fifth embodiment.

Firstly, the recording operation will be explained. The switching device 10 and the VDR 12, are controlled by the controller 14e. As shown in FIG. 12, with respect to the block No. n=0 at the time of record start, each of the outputs of the image cutting out sections E1 to E5, is switched for every frame and sequentially recorded. In parallel with the record control to the video disc 11, the high resolution image outputting device 20b is kept to be superintended, so that the information of the image change position is obtained and the image change is inspected. Here, for example, it is assumed that a change occurs only in the display information in the B image from the record image of the block No. n=0, at the timing of recording the block No. n=1. At this time, one frame for each of the whole image H and the image B, is recorded respectively, by switching to only the image cutting out sections E1 and E3. In the same manner, when changes occur all over the whole image H at the timing of recording the block No. n=2, one frame for each of the whole image H and the images A, B, C and D, is respectively recorded. When there is no change in the whole image as shown in block No. 3, no recording is performed.

In this manner, the system is constituted such that, when the change occurs in the image, it records the whole image and the divided image or images only corresponding to the change position or positions, and the recording information data, which consists of the information of the block No. and the record image, is generated as for each block in the same manner as the fourth embodiment. When the operation indication for record-stop is given, the recording information data is recorded to the data area D of the video disc 11 as the image record information.

The system is adapted to also record the whole image with a poor image quality, which is obtained by reducing the original image. However, this is for the purpose of observing the whole image at the time of reproducing, and reproducing the divided high resolution image when a more detailed reproduction is required, by switching to the divided high resolution image. The whole image is not always required to be recorded, depending upon the reproduction mode.

The system is adapted to always extract the image in the above present embodiment. However, the system may be adapted to begin the extracting operation after obtaining the information as for the change position. In this case, the time gap is preferably canceled by installing a frame memory in the input section of the image dividing device 21 to hold the original image.

The reproduction of the record image is performed by Generating the reproduction information, which consists of the record frame No. and reproduction time as for each image, from the recording information data, and by controlling the VDR 12 according to this reproduction information, in the same manner as the fourth embodiment.

In the record control in the above mentioned fourth and fifth embodiments, writing the recording information data to the data area D, is performed, when the operation indication for record-stop is Given. However, the present invention is not limited to this, but may be adapted to temporarily store the recording information data to the RAM in the controller, and write all the record, for example, at once, every predetermined term, or each time when the number of sources of the video signal is changed.

Furthermore, in each of the above mentioned embodiments, the record and reproduction are performed in real time, namely, without the interval between the frame and the frame. However, the system may be adapted to perform the reproduction with such an interval as occasion demands.

In a security system etc., the continuous record is needed. However, the record capacity of the video disc used in the above mentioned fourth and fifth embodiments is limited. Thus, the system may be constituted to keep on recording endlessly, by overwriting if only a short backup time is required.

In each of the fourth and fifth embodiments, though the image recording and reproducing apparatus is a VDR type, and the recording medium is a video disc, a recording medium of random access type is sufficient. Moreover, the record and reproduction may be performed by the field unit in place of the frame unit.

As described above in detail, in correspondence with the video signals outputted from a plurality of video sources, the video signals are recorded to the recording medium of random access type, by the field unit or the frame unit, according to the fourth and fifth embodiments. Thus, recording and displaying operations of the image can be diversified, and it is possible to record easily and speedily. Further, since the video signal is not recorded when the image is the still image which has no change in the image, the efficiency of the record to the recording medium is increased, so that it is possible to make the recording time long.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An adaptive video recording system for selectively recording a plurality of video signals outputted from a plurality of video sources one after another, comprising:

a recording disc, to which at least the video signals and recording information data related to the video signals, are to be recorded in a directly accessible manner;

a recorder for recording the video signals, by a field or frame unit in a time divisional manner by use of a recording format, which is set in accordance with the number of said video sources (k) and in which a field or frame number of the video signals of each video source is expressed by {kn+(1, 2, ..., k)} on said recording disc wherein k denotes the number of said video sources and n denotes the block number of the video signals, and the recording information data, which is related to the video signals and includes information indicating the number of said video sources (k) and the block number (n), to said recording disc; and a switcher, coupled to said video sources and said recorder, for switching and outputting the video signals from said video sources to said recorder by the field or frame unit.

2. A system according to claim 1, further comprising an input signal detector, for detecting an existence of each of the video signals, said switcher switching and outputting the video signal, which existence is detected by said input signal detector, to said recorder, said recorder recording by use of the recording format, which is set in accordance with the number of said video signals which existences are detected by said input signal detector.

3. A system according to claim 1, further comprising a video change detector, coupled to said video sources, for detecting a video change as for each of the video signals, said switcher switching and outputting the video signal, which has the video change detected by said video change detector, to said recorder.

4. An adaptive video recording system for dividing and extracting a plurality of image data from one image data, and selectively recording the extracted image data one after another, comprising:

a recording disc, to which at least the video signals and recording information data related to the video signals, are to be recorded in a directly accessible manner;

a recorder for recording the video signals, by a field or frame unit in a time divisional manner by use of a recording format, which is set in accordance with the number of said divided image data (k) and in which a field or frame number of the video signals of each divided image data is expressed by {kn+(1, 2, ..., k)} on said recording disc wherein k denotes the number of said divided image data and n denotes the block number of the video signals, and the recording information data, which is related to the video signals and includes information indicating the number of said divided image data (k) and the block number on), to said recording disc; and an image extractor for dividing said one image data and extracting a plurality of image data from said one image data, and outputting the extracted image data as the video signals to said recorder one after another.

5. A system according to claim 4, further comprising a change point detector for detecting a change point of display information in said one image data, said image extractor selecting from the extracted image data, which corresponds to the change point of the display information detected by said change point detector, and outputting the selected image data as the video signals to said recorder one after another.

6. A system according to claim 4, further comprising a change point detector for detecting a change point of display information in said one image data, said image extractor extracting image data of the extracted portion including the change point of the display information detected by said change point detector, and outputting the extracted image data as the video signals to said recorder one after another.

7. An adaptive video reproducing system comprising:

a recording disc, to which at least video signals and recording information data, which is related to the video signals and includes information indicating the number of video sources (k) and the block number of the video signals (n), are recorded in a directly accessible manner, said video signals being recorded by a field or frame unit in a time divisional manner by use of a recording format, which is set in accordance with the number of said video sources (k) and in which a field or frame number of the video signals of each video source is expressed by {kn+(1, 2, ..., k)} on said recording disc wherein k denotes the number of said video sources and n denotes the block number of the video signals;

a reproducer for reproducing the video signals and the recording information data recorded on said recording disc; and a reproduction controller for reproducing the recording information data recorded on the recording disc, and controlling a reproduction of the video signals recorded on said recording disc on the basis of the reproduced recording information data as information prescribing a reproduction condition by the field or frame unit according to the recording format.

8. A system according to claim 7, further comprising a display device for synthesizing and displaying the video signals reproduced by the field or frame unit by said reproducer, on the basis of the recording information data reproduced by said reproducer.

9. An adaptive video recording method for selectively recording one after another at least one of a plurality of video signals outputted from a plurality of video sources and/or a plurality of video signals corresponding to a plurality of image data divided and extracted from one image data, said method comprising the steps of:

reading out recording information data from a recording disc, to which at least the video signals and the recording information data, which is related to the video signals and includes information indicating the number of said video sources or said divided image data (k) and the block number of the video signals (n), are recorded in a directly accessible manner, said video signals being recorded by a field or frame unit in a time divisional manner by use of a recording format, which is set in accordance with the number of said video sources or said divided image data, (k) and in which a field or frame number of the video signals of each video source or each divided image data is expressed by {kn+(1, 2, ...., k)} on said recording disc wherein k denotes the number of said video sources or said divided image data and D denotes the block number of the video signals, according to an operation indication for record start;

determining a record starting address at which recording is to be started on the basis of the read out recording information data;

selecting one after another the video signals on the basis of a predetermined condition;

recording the selected video signals to said recording disc from the determined record starting address by use of the recording format;

stopping recording the video signals according to an operation indication for record stop; and recording the recording information data related to the recorded video signals to said recording disc.

10. A method according to claim 9, wherein the step of selecting the video signals, includes the step of detecting existences of the video signals to be selected, and a selection is performed only with respect to the video signals which existences are detected, and the selected video signals are recorded by use of the recording format, which is set in accordance with the number of said video signals which existences are detected by said input signal detector.

11. A method according to claim 9, wherein the step of selecting the video signals, includes the step of detecting a video change as for each of the video signals, and a selection is performed only with respect to the video signals which video changes are detected.

12. A method according to claim 11, wherein the recording information data related to the video signals to be recorded, comprises time information indicating a time duration, in which no video change is detected, as for each of the video signals.

13. An adaptive video reproducing method comprising the steps of:

reading out recording information data from a recording disc, to which at least video signals and the recording information data, which is related to the video signals and includes information indicating the number of video sources (k) and the block number of the video signals (n), are recorded in a directly accessible manner, according to an operation indication for reproduction, said video signals being recorded by a field or frame unit in a time divisional manner by use of a recording format, which is set in accordance with the number of said video sources (k) and in which a field or frame number of the video signals of each video source is expressed by {kn+(1, 2, ..., k)} on said recording disc wherein k denotes the number of said video sources and n denotes the block number of the video signals; and reproducing the video signals recorded on the recording disc on the basis of the read out recording information data, as information prescribing a reproduction information by the field or frame unit according to the recording format.

14. A method according to claim 13, further comprising the step of image-synthesizing the video signals of each of video sources which are reproduced in accordance with data indicating the number of the video sources obtained from the read out recording information data.

15. A method according to claim 13, further comprising the step of obtaining time information indicating a time duration, in which no video signal is detected with respect to the video signals to be reproduced, from the read out recording information data, and reproducing the video signals to be reproduced as a still image during the time duration corresponding to the time information.

* * * * *